(12) United States Patent
Funatsu

(10) Patent No.: US 12,423,854 B2
(45) Date of Patent: Sep. 23, 2025

(54) ELECTRONIC APPARATUS, METHOD FOR CONTROLLING ELECTRONIC APPARATUS, AND STORAGE MEDIUM

(71) Applicant: CANON KABUSHIKI KAISHA, Tokyo (JP)

(72) Inventor: Yoshihiro Funatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 18/180,690

(22) Filed: Mar. 8, 2023

(65) Prior Publication Data

US 2023/0289995 A1   Sep. 14, 2023

(30) Foreign Application Priority Data

Mar. 14, 2022  (JP) ................................. 2022-039131

(51) Int. Cl.
*G06T 7/70*    (2017.01)
*G06V 10/25*   (2022.01)
*H04N 23/67*   (2023.01)
*H04N 23/73*   (2023.01)

(52) U.S. Cl.
CPC ................ *G06T 7/70* (2017.01); *G06V 10/25* (2022.01); *H04N 23/675* (2023.01); *H04N 23/73* (2023.01); *G06T 2207/10144* (2013.01); *G06T 2207/30201* (2013.01)

(58) Field of Classification Search
CPC ............. G06T 7/70; G06T 2207/10144; G06T 2207/30201; G06V 10/25; G06V 10/143; G06V 10/147; G06V 20/20; G06V 40/193; H04N 23/675; H04N 23/73; H04N 23/633; H04N 23/635; H04N 23/61; H04N 23/611
USPC ......................................................... 382/103
See application file for complete search history.

(56) References Cited

U.S. PATENT DOCUMENTS

2016/0295100 A1* 10/2016 Yokozeki ............. H04N 23/635

FOREIGN PATENT DOCUMENTS

JP          2009071433 A     4/2009

* cited by examiner

*Primary Examiner* — Stephen P Coleman
(74) *Attorney, Agent, or Firm* — Canon U.S.A., Inc. IP Division

(57) ABSTRACT

An electronic apparatus calls stored settings related to an automatic focus (AF) area and a type of object to be detected based on a user's specific operation, and performs object detection processing and focus detection processing based on the called settings.

20 Claims, 13 Drawing Sheets

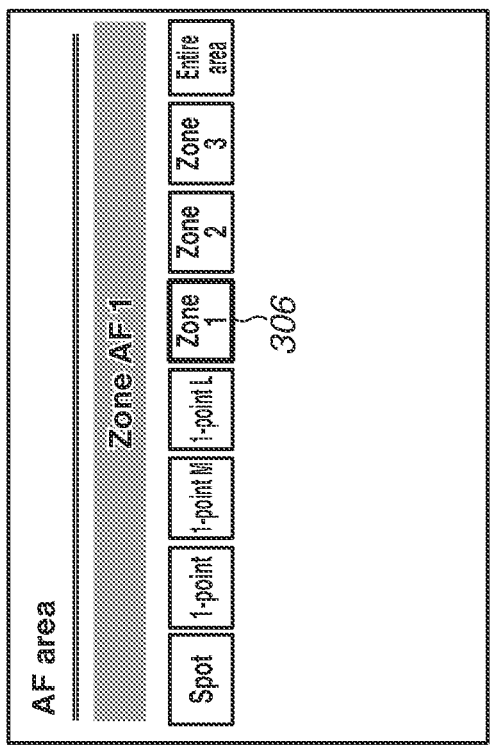
FIG.3A
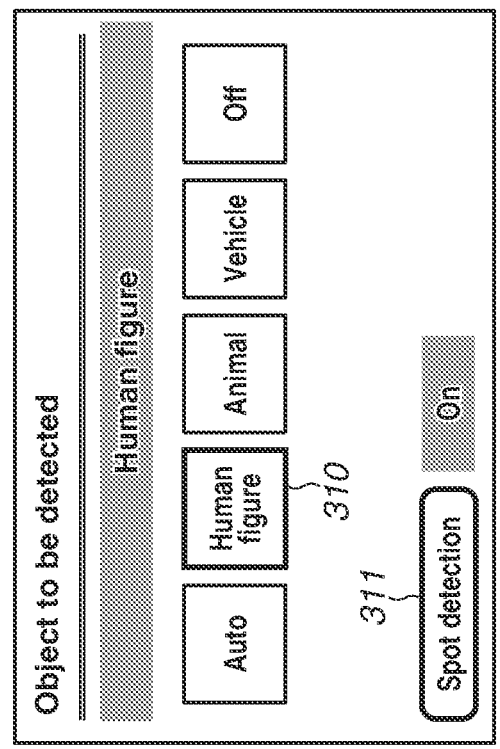
FIG.3B
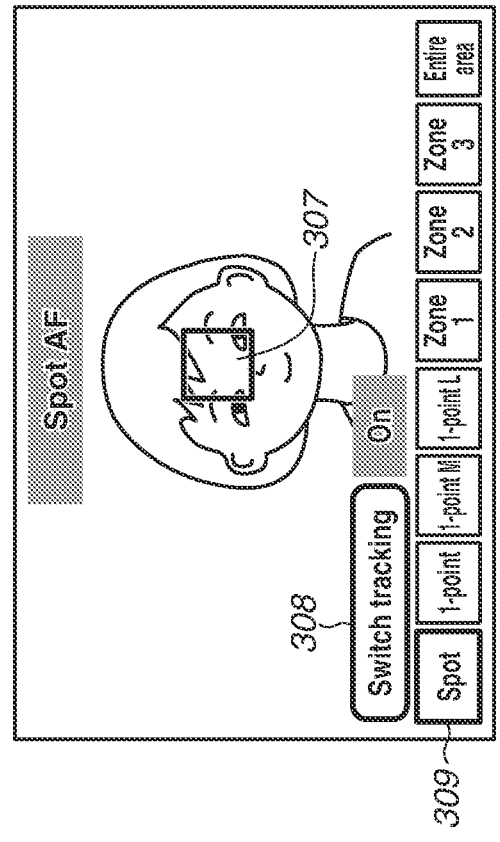
FIG.3C
FIG.3D

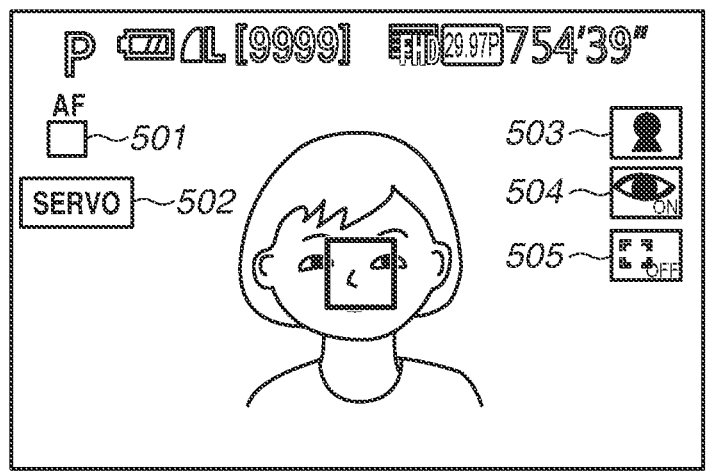

FIG.6

| | BEFORE AF IS ACTIVATED (SW0) | AFTER AF IS ACTIVATED (SW1/SW2) |
|---|---|---|
| SPOT/1-POINT/ POINT EXPANSION | 601 | 602 |
| ZONE/ENTIRE AREA | 603 | 604 |
| DETECTION FRAME | 605 | 606 |
| TRACKING FRAME (TRACKING) | 607 | 608 |
| HP FRAME | 609 | 610 |

FIG. 8B

OPERATION 8c

| | Call registered function > detailed settings | |
|---|---|---|
| ☑ | AF operation | One-shot / Servo |
| ☑ | AF area | 1-point / Zone / Entire Area... |
| ☐ | Call Position | Current position / HP |
| ☐ | Tracking | On / Off |
| ☑ | Object to be detected | Auto / Human figure / Animal / Vehicle / Off |
| ☐ | Spot detection | On / Off |
| ☑ | Pupil detection | On / Off |
| ☐ | AF Start | On / Off |

OPERATION 8d

| | Call registered function > detailed settings | |
|---|---|---|
| ☑ | AF operation | One-shot / Servo |
| ☑ | AF area | 1-point / Zone / Entire Area... |
| ☐ | Call Position | Current position / HP |
| ☐ | Tracking | On / Off |
| ☑ | Object to be detected | Auto / Human figure / Animal / Vehicle / Off |
| ☐ | Spot detection | On / Off |
| ☑ | Pupil detection | On / Off |
| ☑ | AF Start | On / Off |

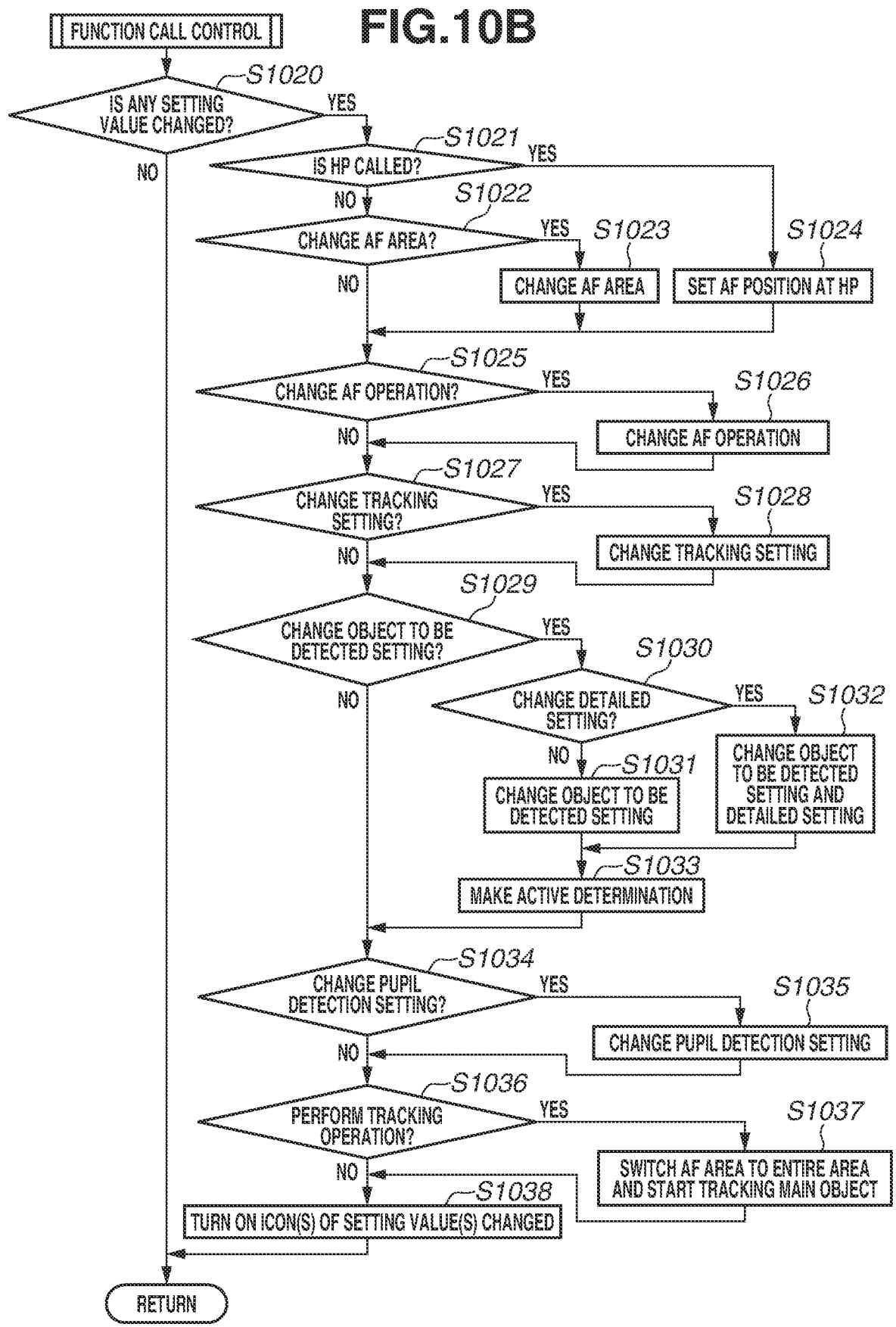

ELECTRONIC APPARATUS, METHOD FOR CONTROLLING ELECTRONIC APPARATUS, AND STORAGE MEDIUM

BACKGROUND

Field of the Disclosure

The present disclosure relates to an electronic apparatus, a method for controlling an electronic apparatus, and a storage medium.

Description of the Related Art

Recent imaging apparatuses have improved automatic exposure performance, automatic focus (AF) performance, and object detection performance, and are capable of most types of imaging in an automatic mode. However, in some imaging scenes, imaging conditions are desirably set individually. In such a case, immediacy of a setting change is desired.

Japanese Patent Application Laid-Open No. 2009-71433 discusses an imaging apparatus including a setting unit configured to individually set a plurality of setting items, a specification unit configured to specify a registration target item to be registered among the plurality of setting items, a registration control unit configured to register a registered imaging condition, and a generation unit configured to call the registered imaging condition based on a user's call operation and generate a new imaging condition on which the registered image condition is reflected. The immediacy of a setting change can thus be achieved by the user registering imaging settings in advance and calling the imaging settings.

However, the method discussed in Japanese Patent Application Laid-Open No. 2009-71433 does not include registering a setting related to object detection, and a method for fully utilizing the advancement of detection performance is not discussed.

Conventional imaging function calls are thus often limited to exposure and AF settings, and none takes account of object determination conditions.

SUMMARY

The present disclosure is directed to achieving immediacy of a setting change with object detection taken into account.

According to an aspect of the present disclosure, a method for controlling an electronic apparatus includes setting a first item related to a type of object to be detected, setting a second item related to an AF area, performing processing for detecting an object of the set type, performing focus detection processing based on information about the set AF area, and storing settings of the set first item and the set second item in combination. Automatic for automatically selecting a type from a plurality of types is set as the type of object to be detected. The stored settings are called by a user's specific operation, and the processing for detecting the object and the focus detection processing are performed based on the called settings.

Further features of the present disclosure will become apparent from the following description of exemplary embodiments with reference to the attached drawings.

BRIEF DESCRIPTION OF THE DRAWINGS

FIGS. 3A to 3D are diagrams related to a menu for changing setting values.

FIGS. 5A and 5B are diagrams illustrating imaging information display and icons indicating setting values.

FIG. 6 is a diagram illustrating frame display before and after automatic focus (AF) activation (operation).

FIGS. 8A and 8B are diagrams for describing screen transitions and operations for function calls.

FIG. 10B is a flowchart illustrating details of function call control.

DESCRIPTION OF THE EMBODIMENTS

Exemplary embodiments of the present disclosure will be described in detail below with reference to the attached drawings.

Configuration of Digital Camera

Figure 1A:
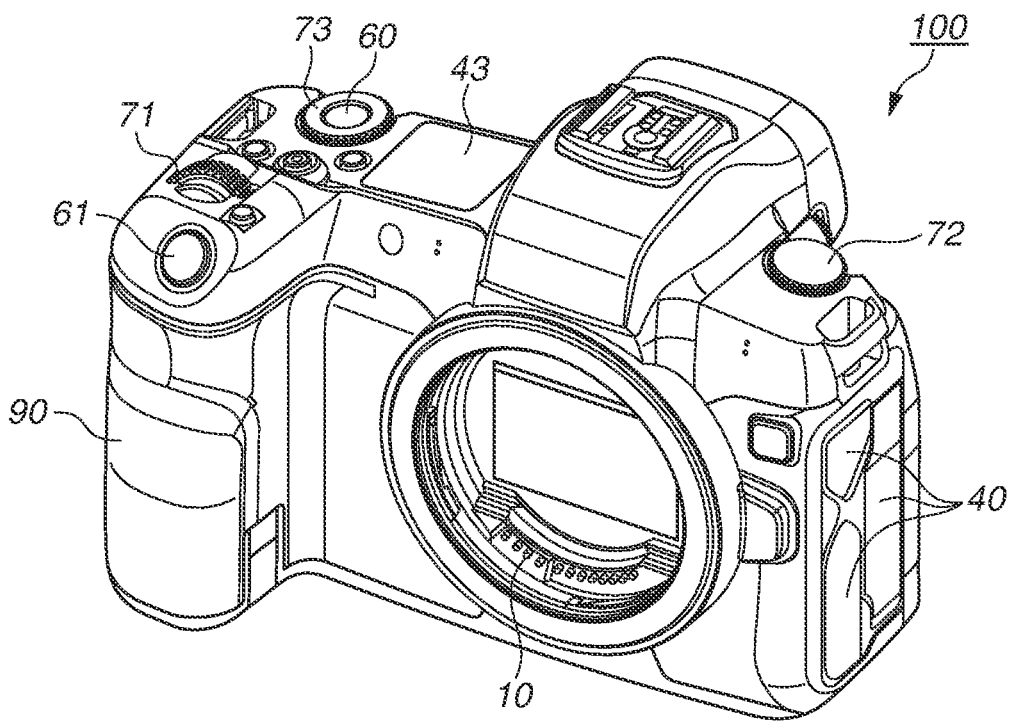
FIGS. 1A and 1B are external views of a digital camera.
Figure 1B:
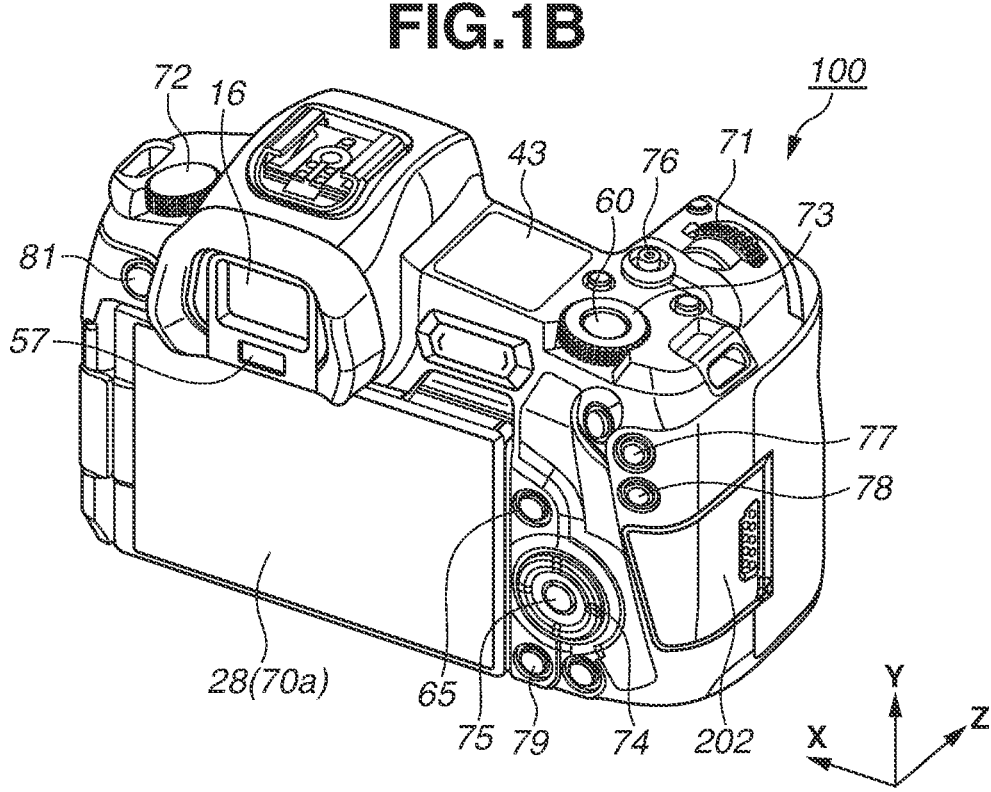

FIGS. 1A and 1B illustrate external views of a digital camera 100 that is an example of an apparatus (electronic apparatus) to which an exemplary embodiment of the present disclosure can be applied. FIG. 1A is a perspective front view of the digital camera 100. FIG. 1B is a perspective rear view of the digital camera 100. In FIGS. 1A and 1B, a display unit 28 is a display unit disposed on the back of the digital camera 100. The display unit 28 displays images and various types of information. A touchscreen 70a can detect a touch operation on the display surface (operation surface) of the display unit 28. An extra-viewfinder display unit 43 is a display unit disposed on the top surface of the digital camera 100. The extra-viewfinder display unit 43 displays various setting values of the digital camera 100, including a shutter speed and an aperture value. A shutter button 61 is an operation unit for issuing imaging instructions. A mode change switch 60 is an operation unit for switching various modes. A terminal cover 40 is a cover that protects connectors (not illustrated) for connecting connection cables from external devices and the digital camera 100.

A main electronic dial 71 is a rotary operation member. Setting values, such as the shutter speed and the aperture value, can be changed by rotating the main electronic dial 71. A power switch 72 is an operation member for powering the digital camera 100 on and off. A sub electronic dial 73 is a rotary operation member, and can move a selection frame or scroll through images. A directional keypad 74 is a directional operation member (four-way keypad) including a push button that can be pressed in four directions, or in top, bottom, left, and right portions. Operations can be performed depending on the pressed portion of the directional keypad 74 in the pressed direction. A set button 75 is a push button and mainly used to determine a selection item.

A moving image button 76 is used to issue instructions to start or stop capturing (recording) a moving image. An automatic exposure (AE) lock button 77 can lock an exposure state when pressed in an imaging standby state. A magnify button 78 is an operation button for turning on and off a magnification mode during a live-view display in an imaging mode. A live-view (LV) image can be magnified or reduced by operating the main electronic dial 71 with the magnification mode on. In a playback mode, the magnify button 78 functions as a magnify button for magnifying a playback image and increasing the magnification ratio. A playback button 79 is an operation button for switching between the imaging mode and the playback mode. If the playback button 79 is pressed during the imaging mode, the imaging mode transitions to the playback mode and the latest image among images recorded on a recording medium 200 can be displayed on the display unit 28. If a menu button 81 is pressed, a menu screen capable of making various settings is displayed on the display unit 28. The user can intuitively make various settings by using the menu screen displayed on the display unit 28, the directional keypad 74, the set button 75, and/or a multi-controller (MC) 65. The MC 65 can accept directional instructions in eight directions and a push operation in the center.

A communication terminals 10 are communication terminals for the digital camera 100 to communicate with a lens unit 150 (attachable and detachable) to be described below. An eyepiece unit 16 is an eyepiece unit of an eyepiece viewfinder (look-through viewfinder). Through the eyepiece unit 16, the user can view a video image displayed on an electronic viewfinder (EVF) 29 inside. An eye access detection unit 57 is an eye access detection sensor for detecting whether the user is making an eye access to the eyepiece unit 16. A lid 202 is a lid for a slot accommodating the recording medium 200.

A grip portion 90 is a holding portion having a shape that the user holding the digital camera 100 can easily grip with the right hand. The shutter button 61 and the main electronic dial 71 are located at positions operable by the index finger of the right hand in a state where the user holds the digital camera 100 with the grip portion 90 gripped by the little finger, ring finger, and middle finger of the right hand. The sub electronic dial 73 is located at a position operable by the right thumb in the same state.

Figure 2:
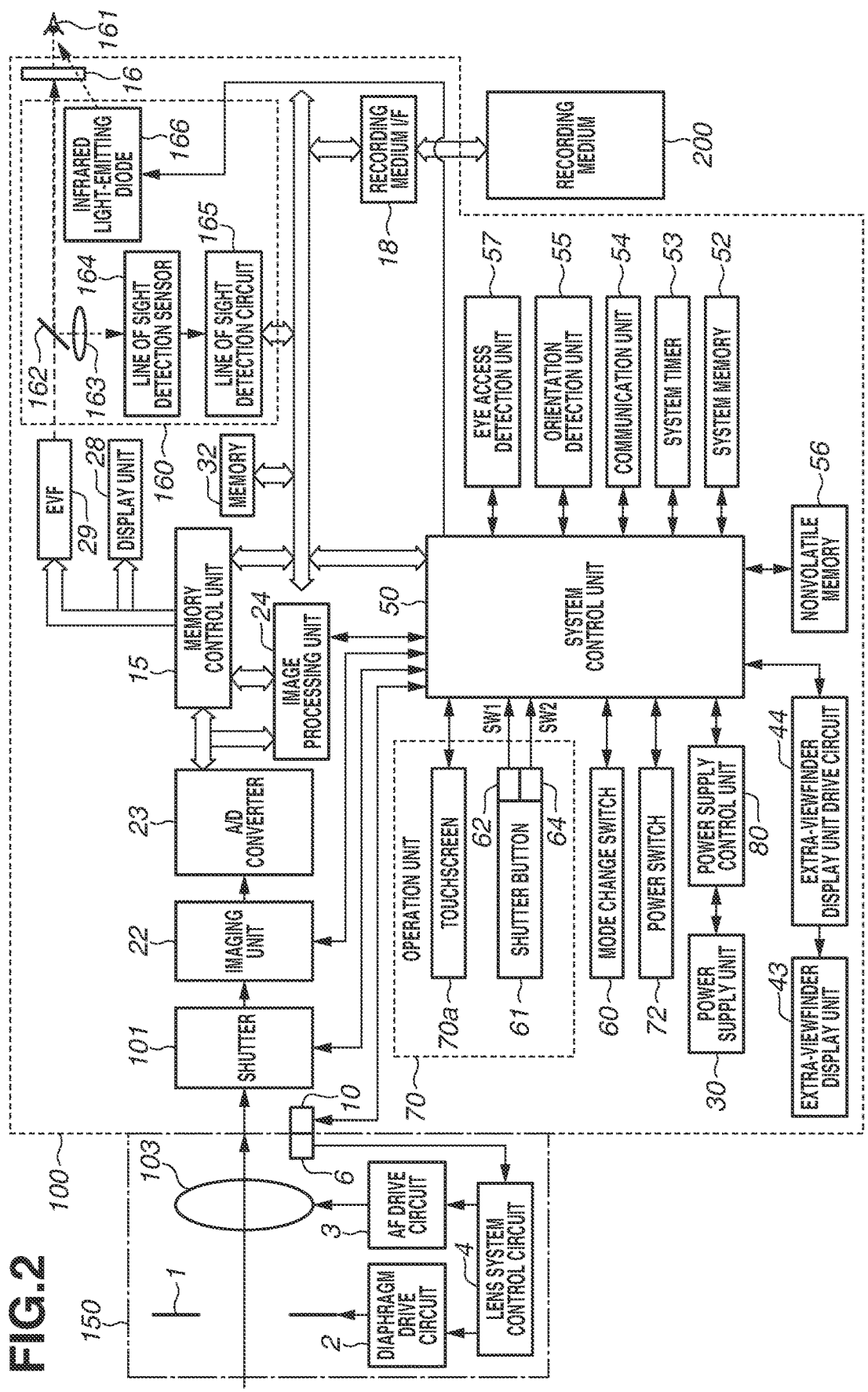
FIG. 2 is a block diagram illustrating a configuration example of the digital camera.

FIG. 2 is a block diagram illustrating a configuration example of the digital camera 100 according to the present exemplary embodiment. In FIG. 2, a lens unit 150 is a lens unit including an interchangeable imaging lens. A lens 103 is typically composed of a plurality of lenses but illustrated as a single lens for the sake of simplification. A communication terminal 6 is a communication terminal for the lens unit 150 to communicate with the digital camera 100. The lens unit 150 communicates with a system control unit 50 via the communication terminal 6 and the foregoing communication terminals 10, and controls a diaphragm 1 via a diaphragm drive circuit 2 using a lens system control circuit 4 inside. The lens unit 150 then adjusts focus by moving the lens 103 via an automatic focus (AF) drive circuit 3.

A shutter 101 is a focal plane shutter that can freely control the exposure time of an imaging unit 22 under control of the system control unit 50.

The imaging unit 22 is an image sensor including a charge-coupled device (CCD) or complementary metal-oxide-semiconductor (CMOS) element for converting an optical image into an electrical signal. An analog-to-digital (A/D) converter 23 converts an analog signal output from the imaging unit 22 into a digital signal.

An image processing unit 24 performs predetermined resize processing, such as pixel interpolation or reduction, and color conversion processing on data from the A/D converter 23 or data from a memory control unit 15 to be described below. The image processing unit 24 also performs predetermined calculation processing using captured image data. The system control unit 50 performs exposure control, focus detection processing, and focus adjustment control based on calculation results obtained by the image processing unit 24. Through-the-lens (TTL) AF processing, AE processing, and electronic flash (EF) (preliminary flash emission) processing are thereby performed. The image processing unit 24 further performs predetermined calculation processing using the captured image data, and performs TTL automatic white balance (AWB) processing based on the obtained calculation results.

The memory control unit 15 controls data transmission and reception between the A/D converter 23, the image processing unit 24, and a memory 32. Output data from the A/D converter 23 is written to the memory 32 via the image processing unit 24 and the memory control unit 15, or directly via the memory control unit 15.

The memory 32 stores image data obtained by the imaging unit 22 and digitally converted by the A/D converter 23. The memory 32 has a sufficient storage capacity to store a predetermined number of still images or a predetermined duration of moving image and sound. The memory 32 also serves as an image display memory (video memory). Image display data written in the memory 32 is displayed on the display unit 28 and the EVF 29 via the memory control unit 15. The display unit 28 and the EVF 29 provide display based on the signal from the memory control unit 15 on a display device, such as a liquid crystal display (LCD) and an organic electroluminescence (EL) display. An LV display can be provided by successively transferring data A/D-converted by the A/D converter 23 and accumulated in the memory 32 to the display unit 28 or the EVF 29. The image displayed in a live view will hereinafter be referred to as an LV image.

An infrared light-emitting diode 166 is a light-emitting element for detecting the user's line of sight position within the viewfinder screen. The infrared light-emitting diode 166 irradiates the user's eyeball (eye) 161 accessing the eyepiece unit 16 with infrared rays. The infrared rays emitted from the infrared light-emitting diode 166 are reflected by the eyeball (eye) 161, and the reflected infrared rays reach a dichroic mirror 162. The dichroic mirror 162 reflects only infrared rays and transmits visible light. The reflected infrared rays changed in the optical path form an image on an imaging surface of a line of sight detection sensor 164 via a focusing lens 163. The focusing lens 163 is an optical member constituting a line of sight detection optical system. The line of sight detection sensor 164 includes an imaging device such as a CCD image sensor.

The line of sight detection sensor 164 photoelectrically convers the incident reflected infrared rays into an electrical signal, and outputs the electrical signal to a line of sight detection circuit 165. The line of sight detection circuit 165 includes at least one processor. The line of sight detection circuit 165 detects the user's line of sight position from an image or movement of the user's eyeball (eye) 161 based on the output signal of the line of sight detection sensor 164, and outputs the detected information to the system control unit 50. The dichroic mirror 162, the focusing lens 163, the line of sight detection sensor 164, the infrared light-emitting diode 166, and the line of sight detection circuit 165 thus constitute a line of sight detection block 160.

In the present exemplary embodiment, the line of sight is detected by a method called corneal reflection, using the line of sight detection block 160. The corneal reflection method detects the direction and position of the line of sight from a positional relationship between the infrared rays emitted from the infrared light-emitting diode 166 and reflected by the eyeball (eye) 161, or the cornea in particular, and the pupil of the eyeball (eye) 161. There are various other methods for detecting the direction and position of the line of sight, such as a method called scleral reflection using a difference in light reflectance between the iris and white part of the eye. As long as the direction and position of the line of sight can be detected, any line of sight detection method other than the foregoing can be used.

The extra-viewfinder display unit 43 displays various setting values of the digital camera 100, including the shutter speed and the aperture value, via an extra-viewfinder display unit drive circuit 44.

A nonvolatile memory 56 is an electrically erasable and recordable memory. For example, a flash read-only memory (ROM) is used as the nonvolatile memory 56. The nonvolatile memory 56 stores operating constants of the system control unit 50 and programs. The programs here refer to computer programs for performing various flowcharts to be described below in the present exemplary embodiment.

The system control unit 50 is a control unit including at least one processor or circuit, and controls the entirety of the digital camera 100. The system control unit 50 implements various processes according to the present exemplary embodiment to be described below by executing the foregoing programs recorded in the nonvolatile memory 56. A random access memory (RAM) is used as the system memory 52, for example. The operating constants and variables of the system control unit 50 and the programs read from the nonvolatile memory 56 are loaded into the system memory 52. The system control unit 50 also performs display control by controlling the memory 32 and the display unit 28.

A system timer 53 is a clocking unit that measures time used in various types of control and the time of a built-in clock.

Various operation members serving as input units for accepting operations from the user include at least the following: the shutter button 61, the MC 65, the touchscreen 70a, the main electronic dial 71, the sub electronic dial 73, the directional keypad 74, the set button 75, the moving image button 76, the AE lock button 77, the magnify button 78, the playback button 79, and the menu button 81, which are included in the operation unit 70. The mode change switch 60 and the power switch 72 are also included in the operation members for accepting operations from the user.

The operation unit 70, the mode change switch 60, and the power switch 72 function as operations units for inputting various operation instructions into the system control unit 50.

The mode change switch 60 switches the operation mode of the system control unit 50 to either a still image capturing mode or a moving image capturing mode. Still image capturing modes includes an automatic imaging mode, an automatic scene determination mode, a manual mode, an aperture priority mode (aperture value [Av] mode), a shutter speed priority mode (time value [Tv] mode), and a program AE mode (program [P] mode). Various scene modes for implementing scene-specific imaging settings and a custom mode are also included. The user can directly switch to one of these modes using the mode change switch 60. Alternatively, the user can switch to an imaging mode list screen once using the mode change switch 60, and then select one of the modes displayed and switch to the selected mode using another operation member. The moving image capturing mode can similarly include a plurality of modes.

The shutter button 61 is configured as a two-stage switch including a first shutter switch 62 and a second shutter switch 64.

The first shutter switch 62 turns on to generate a first shutter switch signal SW1 when the shutter button 61 on the digital camera 100 is operated halfway, i.e., half-pressed (imaging preparation instruction). The system control unit 50 starts imaging preparation operations, such as the AF processing, the AE processing, the AWB processing, and the EF (preliminary flash emission) processing, in response to the first shutter switch signal SW1.

The second shutter switch 64 turns on to generate a second shutter switch signal SW2 when the shutter button 61 is fully operated, i.e., fully pressed (imaging instruction). The system control unit 50 starts a series of imaging processing operations from signal reading from the imaging unit 22 to the writing of a captured image to the recording medium 200 as an image file, in response to the second shutter switch signal SW2.

A power supply control unit 80 includes a battery detection circuit, a direct-current-to-direct-current (DC-DC) converter, and a switch circuit for switching blocks to be energized, and detects the presence or absence of a battery attached, the type of battery, and the remaining battery level. The power supply control unit 80 also controls the DC-DC converter based on the detection results and instructions from the system control unit 50, and supplies predetermined voltages to various components including the recording medium 200 for predetermined periods. A power supply unit 30 includes a primary battery such as an alkali battery and a lithium battery, a secondary battery such as a nickel-cadmium (NiCd) battery, a nickel metal halide (NiMH) battery, and a lithium ion (Li) battery, and/or an alternating current (AC) adaptor.

A recording medium I/F 18 is an I/F with the recording medium 200, such as a memory card and a hard disk. The recording medium 200 is a recording medium for recording captured images, and includes, for example, a semiconductor memory or a magnetic disk.

A communication unit 54 connects wirelessly or using a cable, and transmits and receives a video signal and an audio signal. The communication unit 54 can connect to a wireless local area network (LAN) and the Internet. The communication unit 54 can also communicate with external devices by using Bluetooth® or Bluetooth® Low Energy. The communication unit 54 can transmit images captured by the imaging unit 22 (including an LV image) and images recorded on the recording medium 200, and can receive images and various other types of information from external devices.

An orientation detection unit 55 detects the orientation of the digital camera 100 with respect to the direction of gravity. Based on the orientation detected by the orientation detection unit 55, it can be determined whether an image captured by the imaging unit 22 is one captured with the digital camera 100 held landscape or one captured with the digital camera 100 held portrait. The system control unit 50 can attach orientation information based on the orientation detected by the orientation detection unit 55 to the image file of the image captured by the imaging unit 22, or rotate the image and record the rotated image. An acceleration sensor or a gyro sensor can be used as the orientation detection unit 55. The movement (e.g., pan, tilt, lift, and whether at rest or not) of the digital camera 100 can also be detected using the acceleration sensor or gyro sensor serving as the orientation detection unit 55.

The eye access detection unit 57 is an eye access detection sensor for detecting approach (eye access) and separation (eye separation) of the eye (object) 161 to/from the eyepiece unit 16 of the viewfinder (approach detection). The system control unit 50 switches display (display state) and non-display (non-display state) of the display unit 28 and the EVF 29 depending on the state detected by the eye access detection unit 57. More specifically, suppose that the digital camera 100 is at least in the imaging standby state and a display destination switch setting of the LV image captured by the imaging unit 22 is an automatic switch setting. In such a case, the system control unit 50 turns display on with the display unit 28 as the display destination and hides the EVF 29 during non-eye access. The system control unit 50 turns display on with the EVF 29 as the display destination and hides the display unit 28 during eye access. An infrared proximity sensor can be used as the eye access detection unit 57, for example. The eye access detection unit 57 can detect approach of an object to the eyepiece unit 16 of the viewfinder having the built-in EVF 29. If an object approaches, infrared rays projected from a light projection part (not illustrated) of the eye access detection unit 57 are reflected from the object and received by a light reception part (not illustrated) of the infrared proximity sensor. The distance of the approaching object to the eyepiece unit 16 (eye access distance) can also be determined based on the amount of infrared rays received. The eye access detection unit 57 thus performs eye access detection to detect the proximity distance of the object to the eyepiece unit 16. In the present exemplary embodiment, suppose that the light projection part and the light reception part of the eye access detection unit 57 are devices separate from the infrared light-emitting diode 166 and the line of sight detection sensor 164 described above. However, the infrared light-emitting diode 166 can serve as the light projection part of the eye access detection unit 57. The line of sight detection sensor 164 can also serve as the light reception part.

When an object approaching from a non-eye access state (non-approaching state) to within a predetermined distance from the eyepiece unit 16 is detected, eye access is detected. When the object of which the approach is detected in an eye access state (approaching state) gets separated a predetermined distance or more, eye separation is detected. The threshold for detecting eye access and the threshold for detecting eye separation may be different from each other. For example, the thresholds can have a hysteresis. After the detection of eye access, the eye access state lasts until eye separation is detected.

After the detection of eye separation, the non-eye access state lasts until eye access is detected. Note that the infrared proximity sensor is just an example, and any other sensor capable of detecting the approach of an eye or object that can be considered to be eye access can be used as the eye access detection unit 57.

Based on the output from the line of sight detection block 160, the system control unit 50 can detect the following operations or states:
That the line of sight of the user making eye access to the eyepiece unit 16 is newly input (detected). That is, a start of a line of sight input.
A state where there is a line of sight input of the user making eye access to the eyepiece unit 16.
A state where the user making eye access to the eyepiece unit 16 is gazing.
That the user making eye access to the eyepiece unit 16 looks away. That is, an end of the light of sight input.
A state where the user making eye access to the eyepiece unit 16 is not making any line of sight input.

As employed herein, gazing refers to a case where the amount of movement of the user's line of sight position does not exceed a predetermined amount of movement within a predetermined time.

The touchscreen 70a and the display unit 28 can be integrally configured. For example, the touchscreen 70a is configured such that the light transmittance thereof does not interfere with the display of the display unit 28, and attached onto the display screen of the display unit 28. The input coordinates of the touchscreen 70a and the display coordinates on the display surface of the display unit 28 are then associated with each other. This can provide a graphical user interface (GUI) as if the user can directly operate the screen displayed on the display unit 28. The system control unit 50 can detect the following operations or states of the touchscreen 70a:
That a finger or pen that has not being touching the touchscreen 70a makes a new touch on the touchscreen 70a. That is, a start of a touch (hereinafter, referred to as a touch-down).
A state where a finger or pen is touching the touchscreen 70a (hereinafter, referred to as a touch-on).
That a finger or pen touching the touchscreen 70a is moving (hereinafter, referred to as a touch-move).
That a finger or pen that has being touching the touchscreen 70a is released. That is, an end of a touch (hereinafter, referred to as a touch-up).
A state where nothing is touching the touchscreen 70a (hereinafter, referred to as a touch-off).

If a touch-down is detected, a touch-on is detected at the same time. After a touch-down, a touch-on usually continues to be detected unless a touch-up is detected. A touch-move is detected in a state where a touch-on is detected. If a touch-on is detected and the touch position does not move, a touch-move is not detected. After a touch-up of all fingers and pens touching is detected, a touch-off is detected.

The system control unit 50 is notified of such operations and states and the position coordinates of the touching fingers and pens on the touchscreen 70a, via an internal bus. The system control unit 50 determines what operation (touch operation) is performed on the touchscreen 70a based on the notified information. In the case of a touch-move, the vertical and horizontal components of the moving direction of a finger or pen moving on the touchscreen 70a can be separately determined based on a change in the position coordinates. If a touch move is detected for a predetermined distance or more, a slide operation is determined to be performed. An operation of quickly moving a finger touching the touchscreen 70a for some distance and immediately releasing the finger is called flick. In other words, a flick is an operation of quickly moving the finger along the touchscreen 70a as if flicking. A flick can be determined to be performed (a flick can be determined to be performed after a slide operation) if a touch-move for a predetermined distance or more at a predetermined speed or more is detected and a touch-up is immediately detected. A touch operation of simultaneously touching a plurality of points (for example, two points) and bringing the touch positions close to each other will be referred to as a pinch-in, and a touch operation of moving the touch positions away from each other as a pinch-out. A pinch-out and a pinch-in are collectively referred to as a pinch operation (or simply a pinch). Any one of touchscreens of various methods including resistive, capacitive, surface acoustic wave, infrared, electromagnetic induction, image recognition, and optical sensor methods can be used as the touchscreen 70a. In some methods, the presence of a touch is detected based on contact with the touchscreen. In some methods, the presence of a touch is detected based on approach of a finger or pen to the touchscreen. Either type of method can be used.

The user can set a method for designating the position of a position index based on a touch-move operation performed in an eye access state, to either absolute positioning or relative positioning. For example, suppose that the position index is an AF frame. In the case of absolute positioning, if the touchscreen 70*a* is touched, an AF position associated with the touched position (position of which the coordinates are input) is set. In other words, the position coordinates where the touch operation has been performed and the position coordinates on the display unit 28 are associated with each other. By contrast, in the case of relative positioning, the position coordinates where the touch operation has been performed and the position coordinates on the display unit 28 are not associated with each other. In relative positioning, the touch position is moved from the currently set AF position in the direction of movement of the touch-move as much as the distance corresponding to the amount of movement of the touch-move regardless of the touch-down position on the touchscreen 70*a*.

Setting Screen

FIGS. 3A to 3D are diagrams related to a menu for changing setting values displayed on the display unit 28 or the EVF 29.

FIG. 3A illustrates a menu setting screen with setting items 301 to 305 and respective setting values.

The setting item 301 is used for AF operation, and it can be set to "one-shot AF" to lock focus after an AF activation (after the imaging preparation instruction) or "servo AF" to perform focus tracking.

The setting item 302 is used for AF area related setting (information), where the size of the area to perform AF can be set. If the setting values are large in number, the setting is made using a dedicated sublevel screen (FIG. 3B). As illustrated in FIG. 3B, the user selects a setting value 306 from a list of setting values.

The setting item 303 is a tracking setting item, where whether to perform tracking after the AF is activated (after the imaging preparation instruction) can be set. An object to be tracked is determined from the AF area before the AF activation (before the imaging preparation instruction), and the size of the AF area is increased to the entire area to track the object over the entire screen after the AF activation (after the imaging preparation instruction).

The setting item 304 is an object to be detected setting item, where the type of object to be detected to give priority to in determining a main object is selected. In the present exemplary embodiment, as illustrated in FIG. 3D, the type can be selected from "auto", "human figure" 310, "animal", "vehicle", and "off". If a main object is detected based on this setting, the user is notified of the main object by displaying a detection frame around the main object. Some setting values can be set in more detail, like a setting item 311. Here, the image processing unit 24 can perform object detection processing for detecting a specific object using captured image data. In the present exemplary embodiment, a human figure, an animal such as a dog, a cat, and a bird, a vehicle, or spot as a main area of such objects is detected (spot-detected) as the specific object. For example, the body, head, pupils, and face can be spot-detected from a human figure. For example, the pupils, face, and body can be spot-detected from an animal. If a vehicle is selected, local parts can be spot-detected. For example, the driver of a car, the first car of a train, or the cockpit of an airplane is detected by priority.

Machine learning-based training techniques and image processing-based recognition processing are used for such detection methods.

Examples of types of machine learning include the following:

(1) support vector machines,
(2) convolutional neural networks, and
(3) recurrent neural networks.

An example of the recognition processing in the case of detecting a face is a method for extracting a skin-color area based on pixel tones expressed by image data and detecting a face based on the degrees of matching with face contour templates prepared in advance. Another example is a method for performing face detection by extracting facial feature points, such as the eyes, nose, and mouth, using conventional pattern recognition techniques. The main area detection techniques applicable to the present exemplary embodiment are not limited thereto, and other techniques can be used.

FIG. 3C illustrates a menu screen where an AF area setting 309 and a tracking setting 308 can be simultaneously set. Here, the LV image is displayed on the background, and the user can change the settings while viewing an AF area 307.

If the setting item 304 is set to "auto", an optimum type of object to be detected is automatically selected from a plurality of types. Other items (AF operation and AF area) can be set in association with the respective types of objects to be detected in advance.

Customized Button Functions

FIGS. 4A to 4E are diagrams illustrating a menu for setting customized button functions for activating tracking and calling functions to be displayed on the display unit 28 or the EVF 29.

Figure 4A:
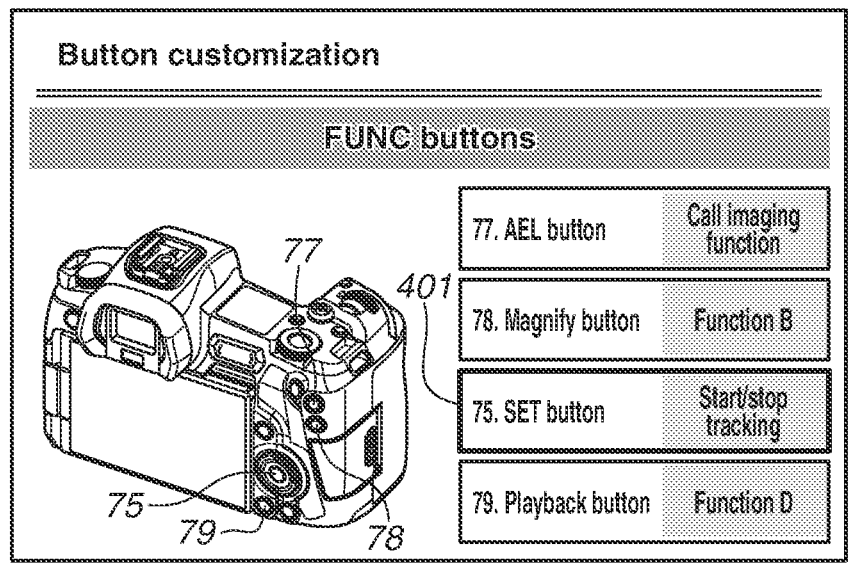
FIGS. 4A to 4E are diagrams related to a menu for setting customized button functions for activating tracking and calling functions.
Figure 4B:
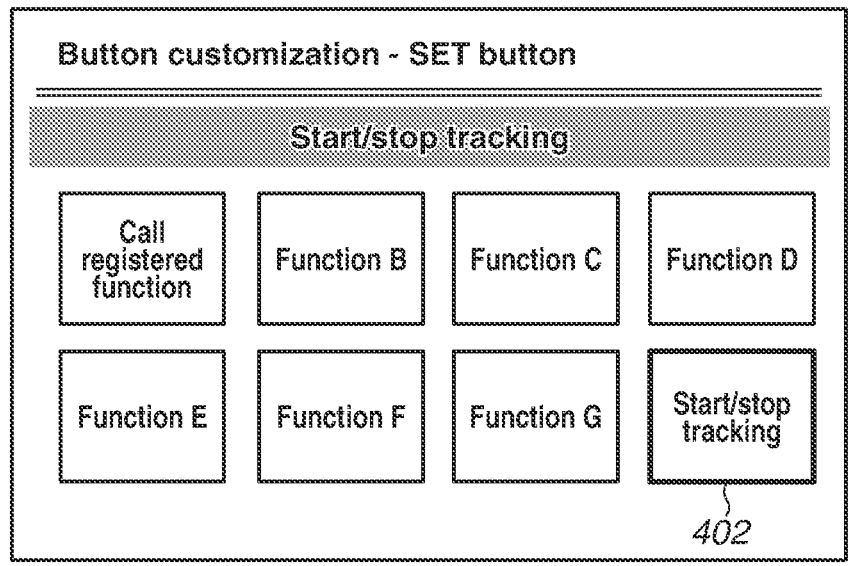

Button customization for activating tracking will be described. For example, as illustrated in FIG. 4A, the user points a cursor (marker) indicating the position of the current processing target to an operation member (for example, button) to be assigned 401 onscreen. In FIG. 4B, functions to be assigned 402 are thereby displayed in a selectable manner. In FIG. 4B, the set button is assigned "start/stop tracking". The function "start/stop tracking" is to start tracking based on the position of the AF area and stop the started tracking regardless of the tracking setting. This function can be activated even during imaging standby (SW0), while AF is on (the first shutter switch is being held, i.e., the first shutter switch signal SW1 is on), or during servo AF (the second shutter switch signal SW2 is on).

Figure 4C:
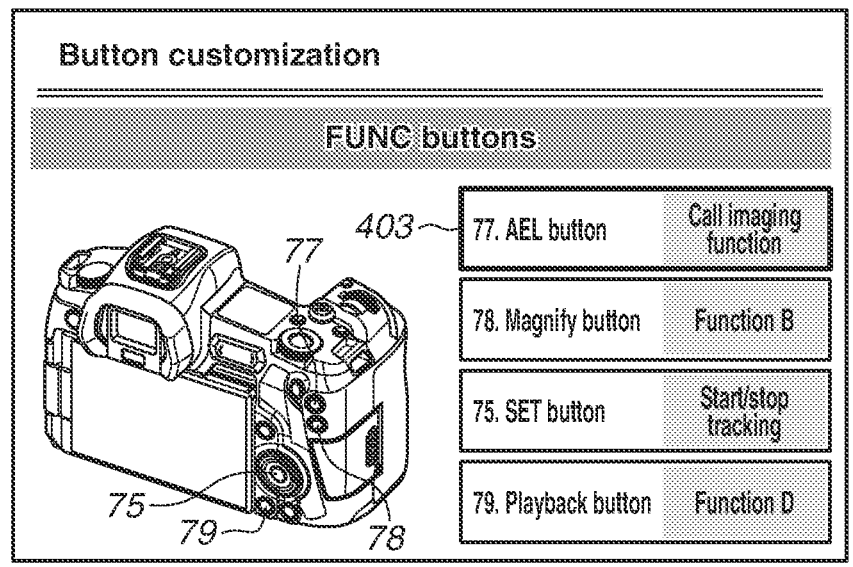
Figure 4D:
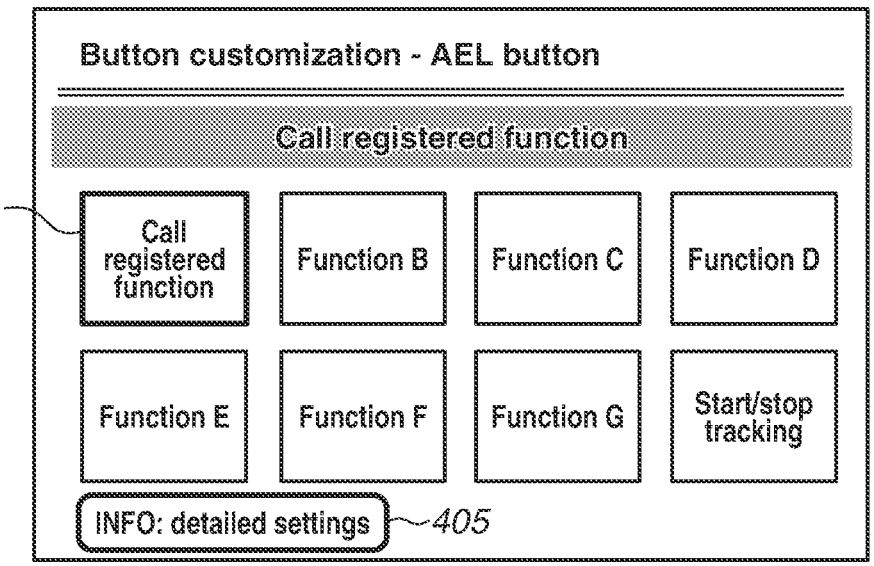

For example, if the user points the cursor to a button to be assigned 403 onscreen as illustrated in FIG. 4C, functions to be assigned 404 are displayed in a selectable manner as illustrated in FIG. 4D. In this diagram, the AE lock (AEL) button 77 is assigned "call registered function".

Figure 4E:
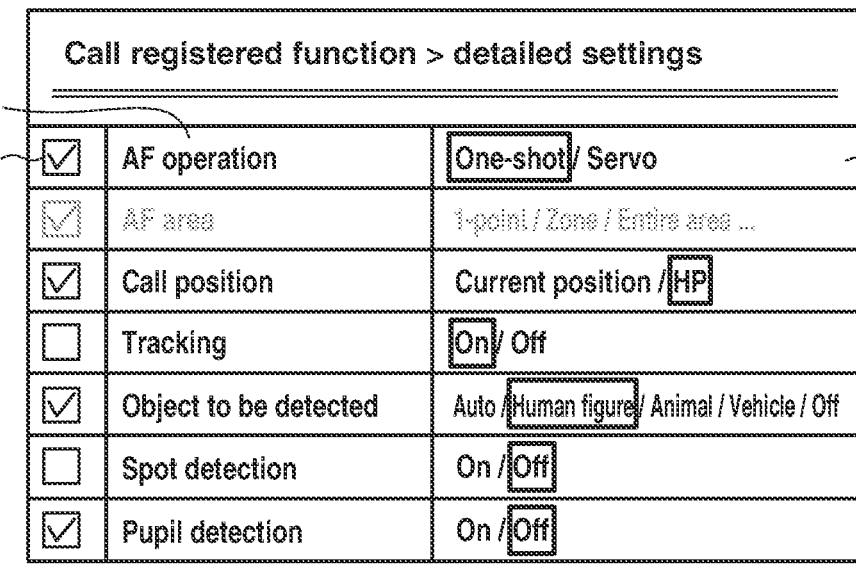

The function "call registered function" is to call a function registered in advance by the user. If a setting item 405 in FIG. 4D is pressed by the user, a detailed setting screen illustrated in FIG. 4E appears. In FIG. 4E, the user can register a function to be called by selecting a setting item 407 of the function to be called, setting a setting value 408, and checking a checkbox 406. In FIG. 4E, an AF operation "one-shot" and a call position "home position (HP)" are registered. In setting an item, other items can be grayed out to indicate that such items are unable to be registered. For example, in FIG. 4E, the AF area setting item is grayed out to indicate that the AF area is unable to be registered. Setting items not checked by the user, like the tracking setting item and the spot detection setting item in FIG. 4E, will not be changed from the current setting values.

Imaging Information Display and Icons Indicating Setting Values

FIGS. 5A and 5B are diagrams for describing imaging information display and icons indicating setting values displayed on the display unit 28 or the EVF 29.

FIG. 5A illustrates an example of a display screen on the display unit 28. An icon 501 indicates an AF area and tracking setting, an icon 502 an AF operation setting, an icon 503 an object to be detected setting, and an icon 504 a pupil detection setting. An icon 505 indicates the state of activation of tracking. The user can find out the current settings and states by observing the icons 501 to 505.

FIG. 5B illustrates examples of lists of icon displays. An icon expressed by a combination of an AF area and a tracking setting, such as an icon 506, is displayed as the icon 501. Icons prepared for respective setting values, such as icons 507, 508, and 509, are displayed as the icons 502, 503, and 504. An icon indicating the state of activation of tracking, such as an icon 510, is displayed as the icon 505.

Frames Displayed Before and After AF Activation

FIG. 6 is a diagram illustrating frames displayed on the display unit 28 or the EVF 29 before and after the AF activation.

In FIG. 6, different frames are displayed between before and after the AF activation. However, the same frames can be displayed. A distinction can be made using different colors, like a frame for one-shot AF operation is displayed in green and a frame for servo AF in blue.

An AF area frame 601 indicates a narrow area, such as a spot, single-point, and point expansion areas. The AF area frame 601 before the AF activation is a rectangle, and an AF area frame 602 after the AF activation is a thick rectangle.

An AF area frame 603 indicates a wide area, such as a zone and an entire area. Before the AF activation, the AF area frame 603 indicates the area with brackets [ ]. After the AF activation, small rectangular frames 604 are displayed only at in-focus points within the AF area frame 603. A plurality of rectangular frames 604 can also be displayed in the area. If the AF area frame 603 indicates the entire screen area, the brackets [ ] can also be hidden before the AF activation.

A detection frame 605 is displayed around an object automatically detected based on the object to be detected setting. In the diagram, the object to be detected is set to "human figure", and the detection frame 605 is displayed around a human face. Depending on the pupil detection setting, detection frames 605 can be displayed around pupil areas. If the object to be detected is set to "animal" or "vehicle", the detection frame 605 is displayed around the entire body or face of an animal or a vehicle. After the AF activation, a rectangular detection frame 606 is displayed according to the detection frame 605. In the present exemplary embodiment, the detection frame 606 is expressed by a dotted line for the sake of distinction from the AF area frame 602. The detection frame can be updated frame by frame to track the object. If the one-shot AF is activated, the frame position is fixed afterward at the in-focus position.

If the user selects the detection frame 605 or a tracking object by a user operation, a tracking frame 607 is displayed. Examples of the user's selection operation include selection with reference to an operation position on the touchscreen 70a, selection through a tracking start operation, and selection from detection frames using the directional keypad 74. After the AF activation, the tracking frame is expressed by a dotted double-lined rectangle 608. Similarly to the detection frame, the tracking frame can be updated frame by frame to track the object. If the one-shot AF is activated, the tracking frame is fixed afterward at the in-focus position.

An HP frame 609 is stored by the user setting the AF area frame 601 or 603 at an intended registration position and performing a registration operation. The HP frame 609 can be called by a button customization function "call HP" or "call imaging function". The HP frame 609 can be called either only during operation or continuously until another call is made. Like an AF area frame, the HP frame is expressed by a thick rectangle (610) after the AF is activated.

Frame Expressions Depending on Combinations of AF Areas and Tracking Settings

Figure 7:
FIG. 7 is a diagram illustrating frame display depending on the combinations of an AF area and a tracking setting.

FIG. 7 is a diagram illustrating frame expressions depending on the combinations of the AF areas and the tracking settings.

States 7-A to 7-I correspond to the combinations of the object to be detected "off" with the AF areas. States 7-J to 7-R correspond to the combinations of the object to be detected "auto", "human figure", "animal", or "vehicle" (i.e., when other than "off" is selected) with the AF areas. Each state illustrates a case where the "AF area frame", the "detection frame", or the "tracking frame" is active.

States 7-A to 7-I where the object to be detected is "off" will initially be described.

If the AF area frame is active, AF area frames corresponding to the respective settings, such as a single-point AF area frame 701 and a zone AF area frame 702, are displayed (states 7-A, and 7-B).

With the object to be detected "off", the object detection processing is not performed and the detection frame therefore does not become active. No frame is thus displayed in state 7-D, 7-E, or 7-F. For the convenience of description, FIG. 7 illustrates the screens in states 7-D, 7-E, and 7-F in gray, whereas an LV display is provided.

If tracking is performed based on the user's selection, a tracking frame 703 is displayed (states 7-G, 7-H, and 7-I). Examples of the tracking frame 703 here include the tracking frame when tracking is started based on an operation position on the touchscreen 70a and the tracking frame when tracking is started with reference to the position of a tracking start operation.

States 7-J to 7-R where the object to be detected is other than "off" will now be described.

In states 7-J to 7-O, if the tracking setting is "on" and a main object is detected, both the AF area frame and the detection frame are displayed, and the frame to be actually used for focusing upon AF activation becomes active. If a main object is not detected, only the AF area frame is displayed as is the case where the object to be detected is "off".

With the main object detected, the frame to be actually used for focusing upon the AF activation is selected in the following manner.

Initially, if the detection frame does not overlap the AF area frame, the AF area frame becomes active (states 7-J and 7-K). If the AF area is the entire area of the screen and no object is detected within the AF area, the entire AF area becomes active (state 7-L) since the detection frame does not overlap the AF area frame. In such a case, however, the AF area frame is hidden since the AF area is the entire area of the screen. For the convenience of description, the screen is illustrated in gray, whereas an LV display is provided. If the AF area frame is active, an AF area frame 704 or 706 is displayed in solid lines, and a detection frame 705 is expressed by translucent lines. When the AF is activated, the focus is adjusted using the AF area frame.

If the detection frame overlaps the AF area frame, the detection frame becomes active (states 7-M, 7-N, and 7-O). In the cases of pupil detection and spot detection, the detection frame can be active without the pupils or spot overlapping the AF area frame, if the face or the object's entire body overlaps the AF area frame. If the detection frame is active, a detection frame 707 is expressed by solid lines and an AF area 708 is expressed by translucent lines.

If tracking is performed based on the user's selection, the tracking setting is "on", and a main object is detected, a tracking frame 709 becomes active and is displayed alone during tracking (states 7-P, 7-Q, and 7-R). If a main object is not detected, the tracking frame is displayed as is the case where the object to be detected is "off".

Figure 8A:
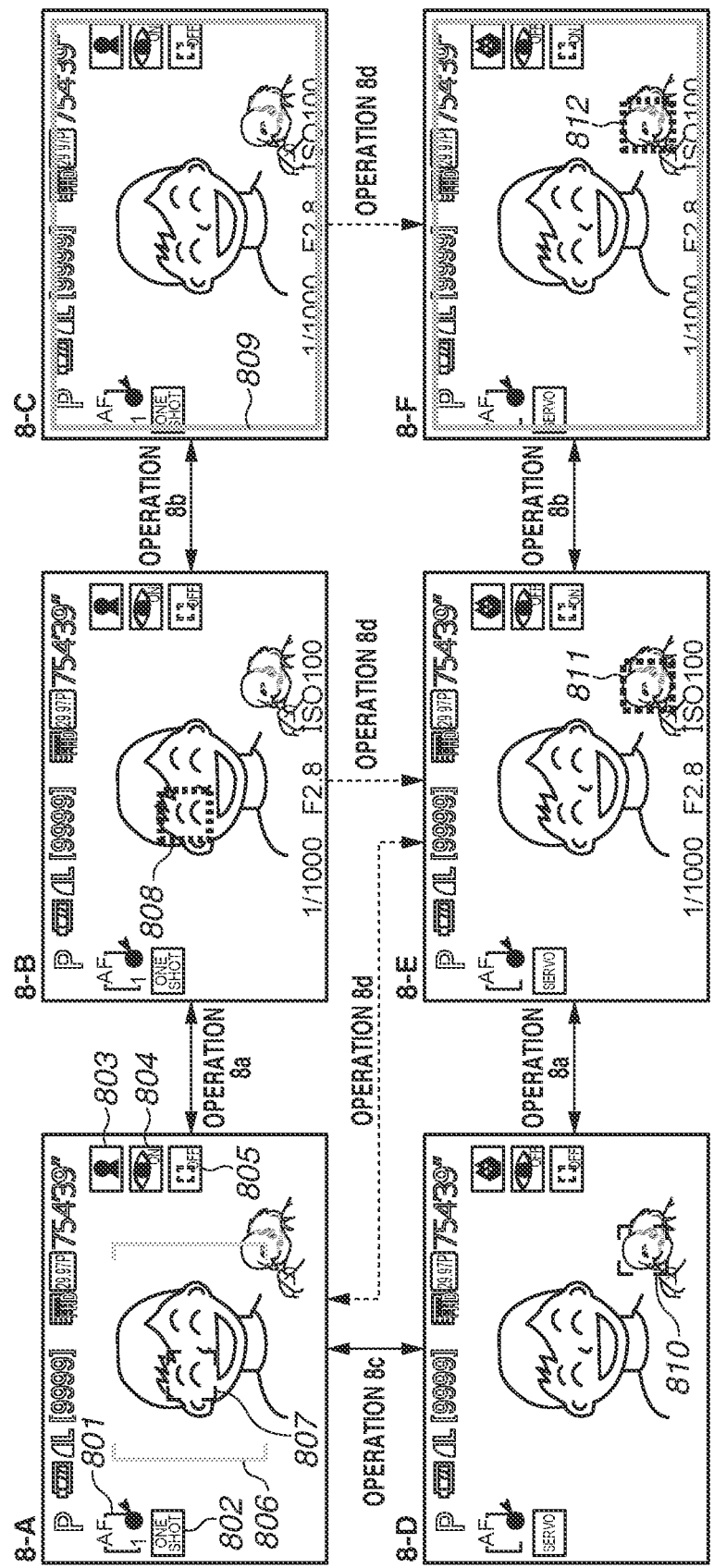

State Transitions Between Imaging Standby State, Imaging Preparation State, and Imaging State FIG. 8A illustrates state transitions between an imaging standby state (states 8-A and 8-D), an imaging preparation state (states 8-B and 8-E), and an imaging state (states 8-C and 8-F).

An icon 801 indicates the setting values of the AF area and the tracking setting. An icon 802 indicates the setting value of the AF operation. An icon 803 indicates the setting value of the object to be detected. An icon 804 indicates the setting value of the pupil detection. An icon 805 indicates the tracking state. A frame display 806 indicates the AF area of zone AF.

A frame display 807 indicates the detection frame on an object to be detected. In the example of FIG. 8A, an object is detected in the AF area. The detection frame thus becomes active, and the AF area frame becomes inactive (See FIG. 7).

In state 8-A, the AF is started (SW1) by operation 8*a*, and the state transitions to state 8-B. Here, an AF operation is performed within the active frame.

In state 8-B, a frame 808 provides an in-focus display. Since the AF operation is set to one-shot AF, the frame position is locked. The frame 808 notifies the user of the in-focus state using different colors, like green when in focus and red when not in focus. When imaging is started (SW2) by operation 8*b*, the state transitions to state 8-C.

In state 8-C, imaging is performed. Display 809 indicates that imaging is in progress. In the present exemplary embodiment, the display 809 may be hidden since whether imaging is in progress can be determined based on shooting sound. During silent imaging, the display 809 is often provided. During continuous shooting by one-shot AF imaging, the in-focus display (frame 808) displayed when the AF is started (SW1) is hidden since the focus is locked.

The state transitions during basic imaging have been described above. Next, function call patterns will be described.

If, in state 8-A, an imaging function is called by operation 8*c*, the state transitions to state 8-D. Here, the icon 801 changes to "entire area×tracking on", the icon 802 to "servo AF", the icon 803 to "animal", and the icon 804 to "pupil detection off". After the call, animal detection is performed over the entire area. The little bird at the lower right is thereby detected as a main object, and a detection frame 810 is displayed. Since the AF area is the entire area, the detection frame 810 becomes active.

If, in state 8-A, an imaging function is called by operation 8*d*, the state transitions to 8-E. While display similar to the case with operation 8*c* is provided, there is a difference in that an AF operation is simultaneously performed. After the AF is performed, an in-focus frame 811 is displayed. Operation 8*d* can also be performed even in state 8-B or 8-C, in which case the state transitions as illustrated in FIG. 8A.

If, in state 8-D, the AF operation is performed by operation 8*a*, the state transitions to state 8-E. Only if the tracking setting is "on" and the AF operation is servo AF, the AF area is expanded to the entire area to track the object while the AF operation is continued. To stop tracking the object, the AF operation is ended or the button customization function "stop tracking" is performed.

If, in state 8-E, imaging is started by operation 8*b*, the state transitions to state 8-F. In the case of servo continuous shooting, the digital camera 100 tracks the object while continuing to focus on the object, and repeats capturing images.

FIG. 8B illustrates menus set by the button customization functions described above with reference to FIGS. 4A to 4E. The left menu is one called by operation 8*c*. The right menu is one called by operation 8*d*.

Call Patterns

FIGS. 9A to 9D are diagrams illustrating call patterns according to the present exemplary embodiment. Four call patterns will be described with reference to FIGS. 9A to 9D.

Figure 9A:
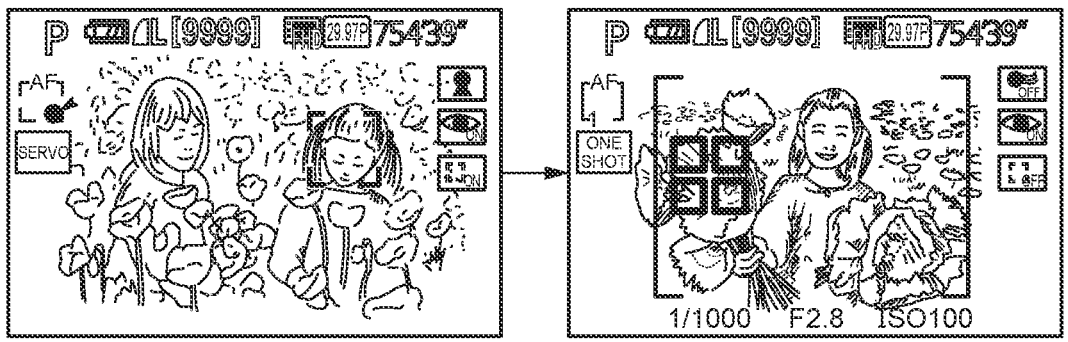
FIGS. 9A to 9D are diagrams illustrating implementation patterns of function calls.

FIG. 9A illustrates a call pattern where "zone×tracking off×detection off" is called from "entire area×human figure detection". Before the call, an image is captured with priority given to the human figure over the entire area, using servo AF because the movement of the object is large. If the user wants to capture the next image with emphasis not on the human figure but on a non-human object, the user turns the detection setting off to automatically select an object within a specific area. AF can also be started at the same time, in which case an image can be captured by a procedure such that a call for one-shot AF is immediately followed by imaging. As illustrated in FIG. 9A, this call pattern is effective in focusing on the nearest flowers in the area. At a wedding bouquet toss, such a call pattern is effective in switching the object to be focused from the bride to the tossed bouquet.

Figure 9B:
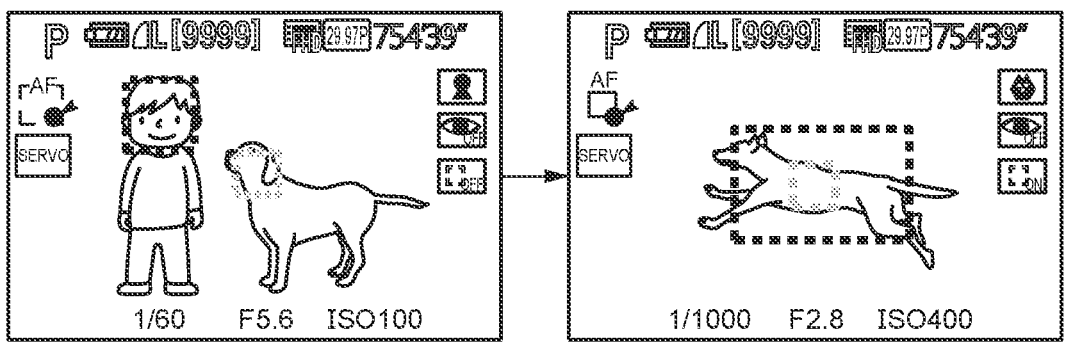

FIG. 9B illustrates a call pattern where "single-point (HP)×tracking on×animal detection" is called from "entire area×human figure detection". Before the call, an image is captured with priority given to the human figure over the entire area. A single point to start servo AF at is registered near the center as an HP in case that an object with large movement appears. When an object with large movement such as an animal appears, the object is detected as a main object and tracking is started around the center by calling this function. Even if a fast moving dog appears as illustrated in FIG. 9B, the dog can be detected at the center as a main object and the object can be tracked. Since the size (single-point or zone) and position of the HP can be stored, calling the HP along with detection settings enables a wide variety of imaging.

Figure 9C:
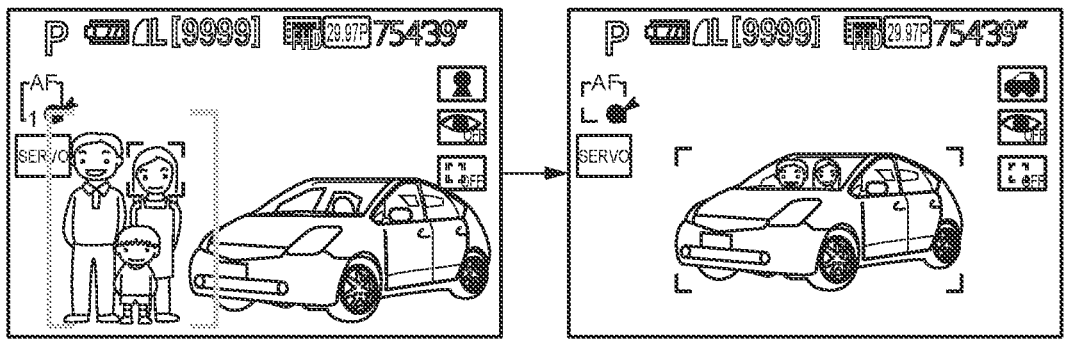

FIG. 9C illustrates a call pattern where "entire area× vehicle detection" is called from "zone×human figure detection". Such a call pattern is effective in capturing an image with priority given to a human figure over the entire area before the call, and then switching the main object to a vehicle to capture an image. Not only automobiles but motorcycles, trains, and airplanes can also be detected as vehicles, and this call pattern is also effective in taking ceremonial photographs, capturing images of motor racing, and event photography. The spot detection setting described with reference to FIGS. 3A to 3D can be used as well to pinpoint the focus even inside a vehicle.

Figure 9D:
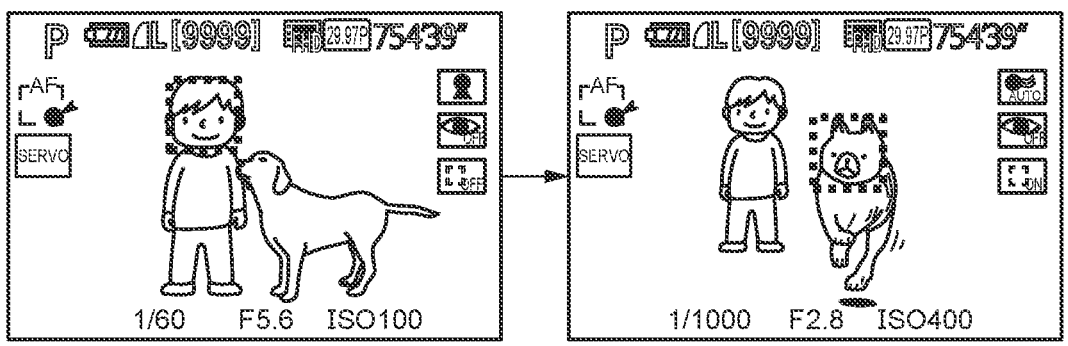

FIG. 9D illustrates a call pattern where "entire area× automatic detection" is called from "entire area×human figure detection". Such a pattern is effective in capturing an image with priority given to a human figure over the entire area before the call, and then temporarily automatically selecting an optimum object from among human figures, animals, and vehicles, switching the main object, to capture an image. This call pattern is effective in capturing images in daily scenes, such as where the user basically captures images of human figures and temporarily wants to detect objects such as an animal and a vehicle. In calling the automatic selection of the object to be detected, the entire area may be called as the AF area and priority may be given to the automatic selection by the digital camera 100. If the object to be detected is set to "auto" as described above and other items (AF operation and AF area) are also set in association with the types of objects to be detected in advance, the stored settings are called.

There are many effective scenes other than the foregoing call patterns. Calling an AF area and a detection setting in combination can improve the user customizability, and enables imaging without missing a photo opportunity.

Figure 10A:
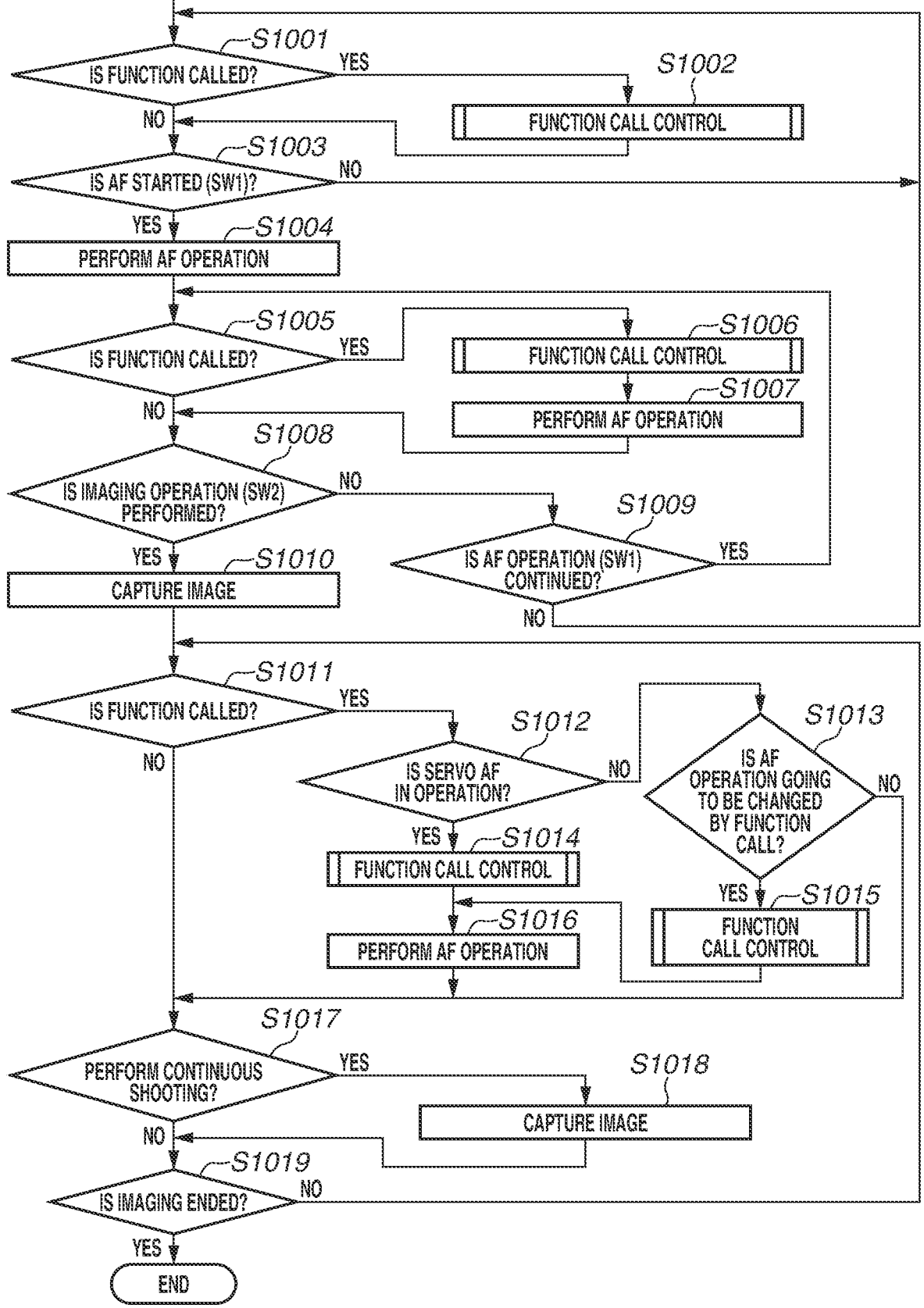
FIG. 10A is a flowchart illustrating control for calling an object detection type and an AF area in combination.

Control Procedure in Calling Type of Object to be Detected and AF Area in Combination FIG. 10A is a flowchart illustrating control according to the present exemplary embodiment. The processes are implemented by the system control unit 50 loading a program stored in the nonvolatile memory 56 into the system memory 52 and executing the loaded program.

In the following flowchart, the processing and control are performed by the system control unit 50.

In step S1001, the system control unit 50 determines whether any function is called. If any function is called (YES in step S1001), the processing proceeds to step S1002. If not (NO in step S1001), the processing proceeds to step S1003.

In step S1002, the system control unit 50 activates function call control.

In step S1003, the system control unit 50 determines whether AF is started (SW1). If AF is started (YES in step S1003), the processing proceeds to step S1004. If not (NO in step S1003), the processing returns to step S1001. If normal imaging preparation settings (change in exposure, movement of the AF area, and other settings) are made in the meantime, the system control unit 50 changes the settings.

In step S1004, the system control unit 50 performs an AF operation. When the one-shot AF is set, the system control unit 50 fixes the focus position after the AF operation is completed. When the servo AF is set, the system control unit 50 continues focus tracking even after the completion of the AF operation.

In step S1005, the system control unit 50 determines whether any function is called. If any function is called (YES in step S1005), the processing proceeds to step S1006. If not (NO in step S1005), the processing proceeds to step S1008.

In step S1006, the system control unit 50 activates the function call control.

In step S1007, the system control unit 50 performs the AF operation. If none of the setting values is changed in step S1006, step S1007 is skipped without performing the AF operation.

In step S1008, the system control unit 50 determines whether an imaging operation (SW2) is performed. If an imaging operation is performed (YES in step S1008), the processing proceeds to step S1010. If not (NO in step S1008), the processing proceeds to step S1009.

In step S1009, the system control unit 50 determines whether the AF operation (SW1) is continued. If the AF operation is continued (YES in step S1009), the processing returns to step S1005. If not (NO in step S1009), the processing returns to step S1001.

In step S1010, the system control unit 50 captures an image.

In step S1011, the system control unit 50 determines whether any function is called. If any function is called (YES in step S1011), the processing proceeds to step S1012. If not (NO in step S1011), the processing proceeds to step S1017.

In step S1012, the system control unit 50 determines whether the servo AF is in operation. If the servo AF is in operation (YES in step S1012), the processing proceeds to step S1014. If not (NO in step S1012), the processing proceeds to step S1013.

In step S1013, the system control unit 50 determines in advance whether the AF operation is going to be changed by the function call. If the AF operation is going to be changed (YES in step S1013), the processing proceeds to step S1015. If not (NO in step S1013), the processing proceeds to step S1017.

In steps S1014 and S1015, the system control unit 50 activates the function call control.

In step S1016, the system control unit 50 performs the AF operation. If none of the setting values is changed in step S1014 or S1015, step S1016 is skipped without performing the AF operation.

In step S1017, the system control unit 50 determines whether to perform continuous shooting. If the system control unit 50 determines to perform continuous shooting (YES in step S1017), the processing proceeds to step S1018. If not (NO in step S1017), the processing proceeds to step S1019.

In step S1018, the system control unit 50 captures an image. Here, the system control unit 50 captures an image based on the drive setting for continuous shooting.

In step S1019, the system control unit 50 determines whether the imaging is ended. If the imaging is ended (YES in step S1019), the processing of this procedure ends. If not (NO in step S1019), the processing returns to step S1011.

Control Procedure for Function Call

FIG. 10B is a flowchart illustrating details of the function call control performed in steps S1002, S1006, S1014, and S1015 of FIG. 10A. The processes are implemented by the system control unit 50 loading a program stored in the nonvolatile memory 56 into the system memory 52 and executing the loaded program.

In the following flowchart, the processing and control are performed by the system control unit 50.

In step S1020, the system control unit 50 determines whether any of the setting values is changed. If any setting value is changed (YES in step S1020), the processing proceeds to step S1021. If not (NO in step S1020), this sub procedure for the function call control ends.

In step S1021, the system control unit 50 determines whether the HP is called. If the HP is called (YES in step S1021), the processing proceeds to step S1024. If not (NO in step S1021), the processing proceeds to step S1022.

In step S1022, the system control unit 50 determines whether to change the AF area. If the system control unit 50 determines to change the AF area (YES in step S1022), the processing proceeds to step S1023. If not (NO in step S1022), the processing proceeds to step S1025.

In step S1023, the system control unit 50 changes the AF area.

In step S1024, the system control unit 50 sets the AF position at the HP.

In step S1025, the system control unit 50 determines whether to change the AF operation. If the system control unit 50 determines to change the AF operation (YES in step S1025), the processing proceeds to step S1026. If not (NO in step S1025), the processing proceeds to step S1027.

In step S1026, the system control unit 50 changes the AF operation.

In step S1027, the system control unit 50 determines whether to change the tracking setting. If the system control unit 50 determines to change the tracking setting (YES in step S1027), the processing proceeds to step S1028. If not (NO in step S1027), the processing proceeds to step S1029.

In step S1028, the system control unit 50 changes the tracking setting.

In step S1029, the system control unit 50 determines whether to change the object to be detected setting. If the system control unit 50 determines to change the object to be detected setting (YES in step S1029), the processing proceeds to step S1030. If not (NO in step S1029), the processing proceeds to step S1033.

In step S1030, the system control unit 50 determines whether to change the detailed setting of the object to be detected setting. If the system control unit 50 determines to change the detailed setting (YES in step S1030), the processing proceeds to step S1032. If not (NO in step S1030), the processing proceeds to step S1031.

In step S1031, the system control unit 50 changes the object to be detected setting.

In step S1032, the system control unit 50 changes the object to be detected setting and the detailed setting.

In step S1033, the system control unit 50 makes an active determination based on FIG. 7, and determines a main object based on the object to be detected setting called. If the object to be detected "auto" is called, the digital camera 100 automatically selects an object to be the main object.

In step S1034, the system control unit 50 determines whether to change the pupil detection setting. If the system control unit 50 determines to change the pupil detection setting (YES in step S1034), the processing proceeds to step S1035. If not (NO in step S1034), the processing proceeds to step S1036.

In step S1035, the system control unit 50 changes the pupil detection setting.

If the step S1036, the system control unit 50 determines whether to perform a tracking operation. If the system control unit 50 determines to perform a track operation (YES in step S1036), the processing proceeds to step S1037. If not (NO in step S1036), the processing proceeds to step S1038.

In step S1037, the system control unit 50 expands the AF area to the entire area and starts tracking the main object.

In step S1038, the system control unit 50 turns on the icon(s) of the changed setting value(s) onscreen for a certain period for user notification. The display position(s) and the icon pattern are as described with reference to FIGS. 5A and 5B.

The foregoing state transitions and flowcharts according to the present exemplary embodiment enable comfortable imaging and provide improved operability by calling various imaging settings and detection settings in combination.

Such means are effective in determining imaging conditions of a digital camera in particular, and thereby enable comfortable imaging without missing a photo opportunity.

In the present exemplary embodiment, rectangular frames are displayed as indices indicating positions and sizes onscreen. However, the frames do not necessarily need to be rectangular. For example, frames having circular, hexagonal, and other shapes can be displayed. A cross sight-like display indicating only position can also be used.

The system control unit 50 can generate metadata based on imaging conditions combining the imaging settings and the detection settings, attach the metadata to image data captured by the imaging unit 22, and record the resulting image data on the recording medium 200. In displaying a recorded image, the metadata recorded in association with the image data can be displayed. The image data and the metadata can be recorded according to a standard such as Exchangeable image file format (Exif).

The foregoing various controls described to be performed by the system control unit 50 can be performed by a piece of hardware. Alternatively, a plurality of pieces of hardware can control the entire apparatus by sharing the processing.

While the exemplary embodiment of the present disclosure has been described in detail above, the present disclosure is not limited to this specific exemplary embodiment, and various modes not departing from the gist of the disclosure are also included in the present disclosure. The foregoing exemplary embodiment demonstrates just one exemplary embodiment of the present disclosure, and various exemplary embodiments can be combined as appropriate.

The foregoing exemplary embodiment has been described to be applied to the digital camera 100. However, such an example is not restrictive, and an exemplary embodiment of the present disclosure can be applied to any display control apparatus that can control image processing. Specifically, an exemplary embodiment of the present disclosure can be applied to a mobile phone terminal, a portable image viewer, a personal computer (PC), a printer apparatus including a viewfinder, home appliances having a display unit, a digital photo frame, a projector, a tablet PC, a music player, a game machine, and an electronic book reader.

According to the foregoing exemplary embodiment, immediacy of a setting change with object detection taken into account can be achieved.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-039131, filed Mar. 14, 2022, which is hereby incorporated by reference herein in its entirety.

What is claimed is:

1. An electronic apparatus comprising:
at least one processor configured to function as:
a first setting unit configured to set a first item related to a type of object to be detected;
a second setting unit configured to set a second item related to an automatic focus (AF) area;
a detection unit configured to perform processing for detecting an object of the type set by the first setting unit;
a focus detection unit configured to perform focus detection processing based on information about the AF area set by the second setting unit; and
a storage unit configured to store settings of a set first item and a set second item in combination,
wherein the first setting unit is configured to set automatic for automatically selecting a type from a plurality of types as the type of object to be detected, and
wherein the settings stored in the storage unit are called by a user's specific operation, and the detection unit is configured to perform the processing for detecting the object and the focus detection unit is configured to perform the focus detection processing based on the called settings.

2. The electronic apparatus according to claim 1, wherein the first setting unit is configured to, if the type of object to be detected is automatic, automatically select the type at least from any of a human figure, an animal, and a vehicle.

3. The electronic apparatus according to claim 2, wherein the first setting unit is configured to further set a specific part of the type of object to be detected.

4. The electronic apparatus according to claim 3, wherein if the type of object to be detected is a human figure, the specific part is at least one of a pupil, a face, a head, and a body.

5. The electronic apparatus according to claim 3, wherein if the type of object to be detected is an animal, the specific part is at least one of a pupil, a face, and a body.

6. The electronic apparatus according to claim 3, wherein if the type of object to be detected is a vehicle, the specific part is at least either a local part or entirety.

7. The electronic apparatus according to claim 1, wherein the first setting unit is configured to further select at least one of a human figure, an animal, and a vehicle as the type of object to be detected.

8. The electronic apparatus according to claim 1, wherein the detection unit is configured to, when the settings stored in the storage unit are called by the user's specific operation, perform the processing for detecting the object with priority given to the type of object to be detected set by the first setting unit.

9. The electronic apparatus according to claim 1, wherein the first setting unit is configured to set the type of object to be detected to off.

10. The electronic apparatus according to claim 1, wherein the second setting unit is configured to set a size of the AF area.

11. The electronic apparatus according to claim 1, wherein the second setting unit is configured to set a position of the AF area.

12. The electronic apparatus according to claim 1,
wherein the storage unit is configured to store a plurality of combinations of the first item and the second item, and
wherein the plurality of combinations is assigned to a plurality of operation members, respectively.

13. The electronic apparatus according to claim 1, further comprising a third setting unit configured to set a third item related to exposure.

14. The electronic apparatus according to claim 1, wherein the specific operation is performed even after an imaging preparation instruction or during continuous shooting.

15. The electronic apparatus according to claim 1, wherein if the specific operation is performed, a setting value to be changed is displayed onscreen for a specific period for user notification.

16. The electronic apparatus according to claim 1, wherein the processing for detecting the object is performed within the AF area set by the second setting unit.

17. The electronic apparatus according to claim 1, wherein the detection unit is configured to detect at least one of a dog, a cat, a bird, an automobile, a motorcycle, a train, and an airplane as the type of object to be detected.

18. The electronic apparatus according to claim 1, further comprising an imaging unit.

19. A method for controlling an electronic apparatus, comprising:
setting a first item related to a type of object to be detected;
setting a second item related to an AF area;
performing processing for detecting an object of the set type;
performing focus detection processing based on information about the set AF area; and
storing settings of the set first item and the set second item in combination,
wherein automatic for automatically selecting a type from a plurality of types is set as the type of object to be detected, and
wherein the stored settings are called by a user's specific operation, and the processing for detecting the object and the focus detection processing are performed based on the called settings.

20. A non-transitory computer-readable storage medium storing a program for causing a computer to perform a method for controlling an electronic apparatus, the method comprising:
setting a first item related to a type of object to be detected;
setting a second item related to an AF area;
performing processing for detecting an object of the set type;
performing focus detection processing based on information about the set AF area; and
storing settings of the set first item and the set second item in combination,
wherein automatic for automatically selecting a type from a plurality of types is set as the type of object to be detected, and wherein the stored settings are called by a user's specific operation, and the processing for detecting the object and the focus detection processing are performed based on the called settings.

* * * * *